Figure 1:
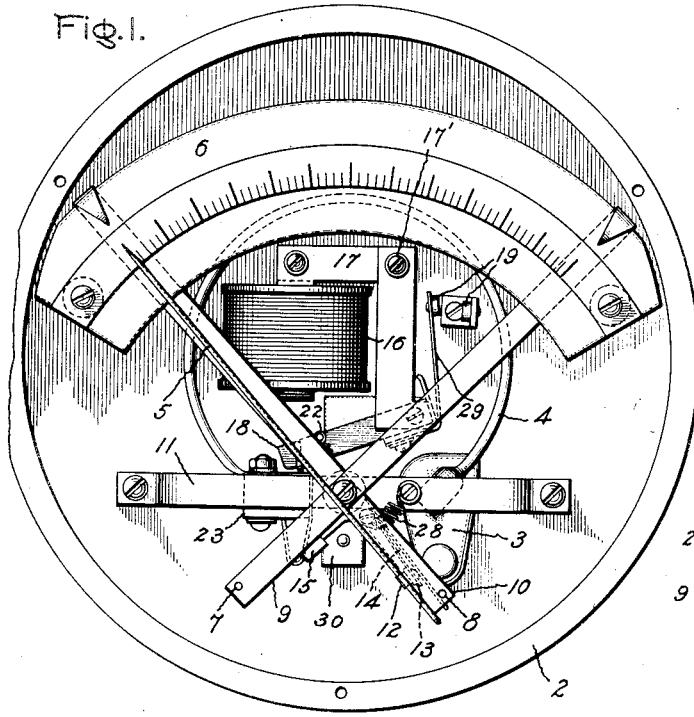

Jan. 16, 1923.

L. W. THOMPSON.
PRESSURE GOVERNOR.
FILED APR. 1, 1918.

1,442,309.

Inventor:
Louis W. Thompson,
by
His Attorney.

Patented Jan. 16, 1923.

1,442,309

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

PRESSURE GOVERNOR.

Application filed April 1, 1918. Serial No. 226,131.

*To all whom it may concern:*

Be it known that I, LOUIS W. THOMPSON, a citizen of the United States, residing at Schenectady, in the county of Schenectady, State of New York, have invented certain new and useful Improvements in Pressure Governors, of which the following is a specification.

My invention relates to pressure governors or the like and has for its object the provision of improved means whereby air or gas pressure may be controlled over a definite range in a reliable, simple and efficient manner.

My invention relates more specifically to pressure governors comprising a member movable between limits in accordance with the pressure to close the circuit of an electric motor driving a compressor when the pressure drops to a predetermined value and maintaining it closed until the pressure increases to another predetermined value. In such governors ordinarily a Bourdon tube or gauge spring operates a pointer to indicate the pressure and when the pointer indicates the minimum pressure a contact is made which starts the compressor. As the pressure rises, the pointer moves over its range until it indicates the maximum, whereupon the contact is broken and the compressor stopped. This involves maintaining a contact throughout the movement of the pointer toward maximum, and since the pointer is subject to some vibrations, due to variations in pressure and external causes, such as the pulsations of the pump pistons, there is frequently vibration at the contact which causes destructive arcing. One of the objects of my invention is to provide means whereby this contact is maintained substantially constant throughout the range of the indicator regardless of the vibrations of the indicator.

In carrying out my invention in one form I provide a contact element which moves between two definite limits and is normally biased toward the position which the pointer assumes at low pressure. When, therefore, the pointer reaches the low pressure position it engages this contact which closes the circuit of an electromagnet. This electromagnet does two things; first, it closes the circuit of an electromagnetic switch which in turn closes the motor circuit; and second, it puts a spring under strain which forces the contact into engagement with the pointer. As the pointer moves over its range, therefore, the contact element follows it, always being spring pressed toward it so that the vibrations and other movements of the pointer will not affect the electrical contact. When the pointer reaches the position of maximum pressure, the contact element engages a stop which holds it while the pointer moves on far enough to break the circuit of the magnet at the contact. When this happens, the switch opens with a quick action due to the spring and stops the motor and at the same time the contact element is moved back to its initial position by a counterweight or spring.

Figure 2:
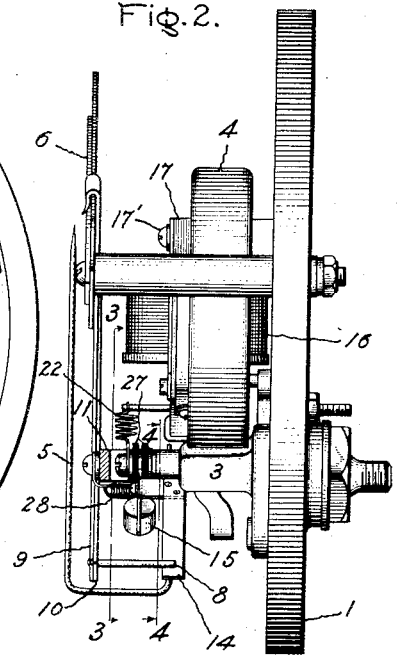
Figure 3:
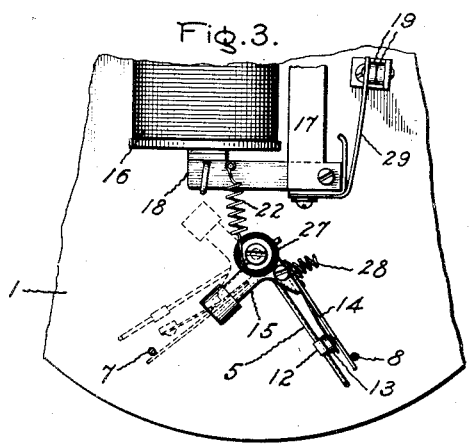
Figure 4:
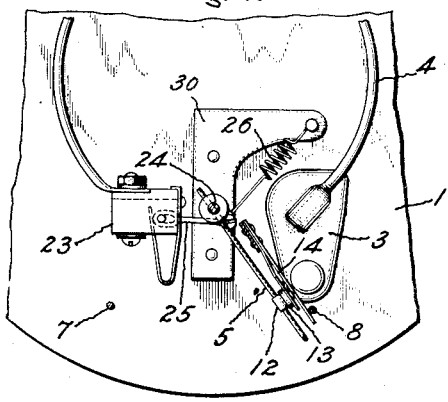
Figure 5:
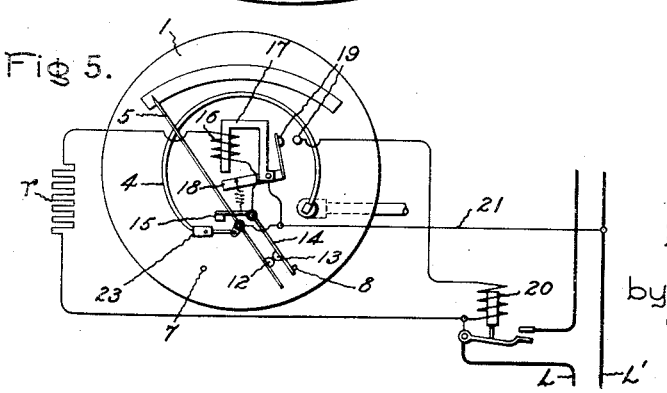

The invention will best be understood by referring to the accompanying drawing in which Fig. 1 is a front elevation of the pressure governor with the cover of the casing removed; Fig. 2 is a side elevation of the governor element removed from the casing; Fig. 3 is a detail view taken on the line 3—3 in Fig. 2; Fig. 4 is a detail view taken on line 4—4 in Fig. 2, and Fig. 5 is a diagrammatic view showing the electrical connections.

Referring to the drawing the various elements of my pressure governor are mounted upon a base plate 1 and enclosed within a casing 2 having a cover, not shown, provided with a window permitting a view of the dial and indicating needle.

Mounted upon the base plate 1 by means of a bracket 3 is a Bourdon tube or gauge spring 4, arranged to move a pointer 5 over the dial plate 6, the range of movement being determined by two stops 7 and 8 carried by the arms 9 and 10, respectively, attached to a supporting member 11 mounted on the base plate.

When the pressure is at a predetermined minimum and the pointer in the position shown in the drawings, a contact 12 carried by the pointer engages a contact 13 on a spring arm 14 carried by a counter weighted member 15. The engagement of these contacts energizes a coil 16 having a magnet structure 17, the circuit being closed from line L (Fig. 5) through resistance $r$, the magnet coil 16, the contact arm 14 and its contact 13, to the contact 12 on the pointer and thence to line L'.

The energizing of the magnet coil 16 pulls up the armature 18 and closes contacts 19 thus completing a circuit from line L, through the operating coil of the line contactor 20, contacts 19 and lead 21 to line L'. This causes the contactor to close the compressor motor circuit and start the motor, and as the pressure increases, the pointer moves over the dial and the contacts 12 and 13 are held closed by a spring 22 connecting the armature 18 and the member 15; the spring being put under tension when the armature 18 is pulled up.

As the pointer continues to move over the dial it finally approaches the point of the desired maximum pressure fixed by the stop 7, and the arm 14 comes in contact with and is stopped by the stop 7 while the pointer is not intercepted by the stop and continues to move slightly beyond the stop so that the contacts 12 and 13 are separated. The coil 16 of the magnet is thus deenergized and releases the armature, the contact carrying arm 14, by reason of the counterweight 15 being returned to the stop 8. The contactor circuit is also broken with a quick break at contacts 19 and the motor circuit opened. The pressure will now gradually decrease and the pointer 5 travels back over the dial until it finally reaches the point of minimum pressure and the contacts 12 and 13 are again closed thus energizing the magnet coil 16 causing the motor circuit contactor to be again closed.

In the particular arrangement illustrated, the movable end of the Bourdon tube 4 is attached to the block 23 and the pointer 5 is carried by a pivot 24 adapted to be rotated by the movement of the block 23 by a link connection 25, the pointer being biased to the position shown in the drawing, that is, the point indicating the minimum pressure, by a spring 26 one end of which is hooked on a pin on the plate 30. The counterweight member 15 which carries the contact arm 14 is pivoted on the same stud with the pointer 5, but insulated therefrom by bushing 27. In the arrangement illustrated, the electrical connection between the coil 16 and the contact carrying arm 14 is provided by connecting the terminal of the coil to the supporting member 11 and through the pigtail connection 28 to the member 14. The electrical connection for the contacts 19, closed by the lifting of the armature, extends through the contact carrying arm 29 and the magnet frame to screw 17' which extends through the back plate.

While I have described my invention as embodied in concrete form and as operating in a specific manner in accordance with the provisions of the patent statutes, it should be understood that I do not limit my invention thereto as various modifications thereof will suggest themselves to those skilled in the art without departing from the spirit of my invention the scope of which is set forth in the annexed claims.

What I claim as new and desire to secure by Letters Patent of the United States, is:

1. A pressure governor comprising a movable member, pressure responsive means for moving the member between limits in accordance with the pressure, a contact for controlling the pressure arranged to be engaged by said member at one of said limits and means for causing said contact to follow the member and maintain engagement during all movements of the member between the limits until the other limit is reached.

2. A pressure governor comprising a member movable between limits in accordance with the pressure, a contact arranged to be engaged by said member at one of said limits and electromagnetic means energized upon said engagement for causing said contact to follow the member and maintain engagement during the return movement to the other limit.

3. A pressure governor comprising a member movable between limits in accordance with the pressure, a contact arranged to be engaged by said member at one of said limits, a switch for controlling the production of pressure and an electromagnet energized upon said engagement for operating the switch and causing said contact to follow and maintain engagement during the return movement to the other limit.

4. A pressure governor comprising a movable member, pressure responsive means for moving the member between limits in accordance with the pressure, a contact for controlling the pressure arranged to be engaged by said member at one of said limits and means for causing said contact to follow the member during all movements between the said limits until the other limit is reached and maintain substantially constant contact pressure between the contact and member regardless of sudden movements of said member between the said limits.

5. A pressure governor comprising a member movable between limits in accordance with the pressure, a contact arranged to be engaged by said member at one of said limits, a switch for controlling the production of pressure, an electromagnet energized upon said engagement for operating the switch and causing said contact to follow and maintain engagement during the return movement and means for breaking contact and causing the switch to open with a quick action when the other limit is reached.

6. A pressure governor comprising a movable member, pressure responsive means for moving the member between limits in accordance with the pressure, a contact for controlling the pressure arranged to be engaged by said member at one of said limits and means for yieldingly forcing said contact into engagement with the member at a substantially constant contact pressure during all movements between the limits until the other limit is reached.

7. A pressure governor comprising a member movable between limits in accordance with the pressure, a contact arranged to be engaged by said member at one of said limits and an electromagnet energized upon such engagement to yieldingly force the contact toward the member at a substantially constant pressure during the return movement to the other limit.

8. A pressure governor comprising a member movable between limits in accordance with the pressure, a contact arranged to be engaged by said member at one of said limits, a switch for controlling the production of pressure and an electromagnet energized upon such engagement to operate the switch and yieldingly force the contact toward the member during the return movement until the other limit is reached whereupon the contact is forced away from the member and the electromagnet deenergized.

9. A pressure governor comprising a member movable between limits in accordance with the pressure, a contact arranged to be engaged by said member at one of said limits, a switch for controlling the production of pressure, an electromagnet energized upon said engagement for operating the switch and a spring placed under strain by the operation of said switch to yieldingly force the contact into engagement with the member during the return movement.

10. A pressure governor comprising a movable member, pressure responsive means for moving the member between limits in accordance with the pressure, a contact for controlling the pressure movable between limits and biased toward one of them at which it is engaged by said member and means for causing said contact to follow the member against its bias during the return movement until the other limit is reached whereupon the contact is released and returns in response to its bias.

11. A pressure governor comprising a member movable between limits in accordance with the pressure, a contact movable between limits and biased toward one of them at which it is engaged by said member, an electromagnet energized at such engagement to yieldingly force the contact into engagement with the member during the return movement until the other limit is reached whereupon the magnet is deenergized and the contact returns in response to its bias.

12. A pressure governor comprising a member movable between limits in accordance with the pressure, a contact movable between limits and biased toward one of them at which it is engaged by said member, a switch for controlling the production of pressure, an electromagnet energized at such engagement to operate said switch and yieldingly force the contact into engagement with the member during the return movement until the other limit is reached whereupon the magnet is deenergized and the contact returns in response to its bias.

13. A pressure governor comprising a contact movable between limits and biased toward one of them, an indicator movable over a definite range in accordance with the pressure and engaging said contact in its biased position, a switch for controlling the production of pressure, a spring connected to the contact, a magnet energized upon such engagement to operate the switch and place the spring under strain to force the contact into engagement with the member during the return movement until the movement of the contact is stopped at the other limit and the circuit of the magnet broken at the contact.

In witness whereof, I have hereunto set my hand this 29th day of March, 1918.

LOUIS W. THOMPSON.